BEST AVAILABLE COP

United States Patent [19] [11] 3,754,212
Borsboom et al. [45] Aug. 21, 1973

[54] DETECTION OF LABEL FOULING IN AUTOMATIC RAILROAD CAR IDENTIFICATION SYSTEM

[75] Inventors: Albertus C. H. Borsboom, London S.E. 1, England; Jan Van Harten; Gerrit Van Der Most, both of Amsterdam, Netherlands

[73] Assignee: Shell Oil Company, New York, N.Y.

[22] Filed: July 22, 1971

[21] Appl. No.: 165,299

[30] Foreign Application Priority Data

July 27, 1970 Netherlands ........................ 7011110

[52] U.S. Cl.. 340/146.3 K, 250/219 D, 235/61.6 E, 235/61.11 E, 340/146.3 B

[51] Int. Cl....... G06k 7/12, G06k 9/00, G06k 5/04, G01n 21/30

[58] Field of Search .............. 340/146.3 B, 146.3 K; 235/61.11 E, 61.7 B, 61.12 N, 61.6 E; 250/219 D, 219 DC

[56] References Cited

UNITED STATES PATENTS

| | | | |
|---|---|---|---|
| 3,201,569 | 8/1965 | Conron | 235/61.7 R |
| 3,596,063 | 7/1971 | Curtis | 235/61.11 F |
| 3,617,704 | 11/1971 | Kapsambelis | 235/61.11 E |
| 3,571,571 | 3/1971 | Kapsambelis | 235/61.11 E |
| 3,225,177 | 12/1965 | Stites | 340/146.3 K |
| 3,502,851 | 3/1970 | Kakimoto | 235/61.12 R |
| 3,553,433 | 1/1971 | Sorli | 235/61.7 R |

*Primary Examiner*—Maynard R. Wilbur
*Assistant Examiner*—Robert M. Kilgore
*Attorney*—John G. Graham and Harold L. Denkler et al.

[57] ABSTRACT

Label fouling in an automatic railroad car identification system is detected in response to the intensities of signals from coded visible panels. The identifying panels are color coded, and failing of the panels can produce errors in reading the code. The ratio of intensity of a pair of primary colors in light reflected from a white strip in the panel is used as the measure of degree of fouling.

4 Claims, 3 Drawing Figures

BEST AVAILABLE COP

BEST AVAILABLE COP

DETECTION OF LABEL FOULING IN AUTOMATIC RAILROAD CAR IDENTIFICATION SYSTEM

BACKGROUND OF THE INVENTION

The invention relates to a process and an apparatus for the identification of a vehicle (for instance a railway vehicle) by means of an optical system in which a panel carrying a code in the form of colored strips, which panel is fixed to the vehicle, is scanned by a ray of light emerging from a source of light installed by the side of the road. The coded information is present on the panel in the form of a number of strips of the colors A, B, white and black. The colors A and B are primary colors, for instance red and blue. The ray of light scans the panel in a direction perpendicular to the longitudinal axis of the strips. Reflected light is caught by means of a device that is also installed by the side of the road. The strips are made of retroreflective material, so that the receiver and the source of light can be mounted in the same cabinet. In this way it is ensured that the position of the panels relative to the installed equipment is independent to a high degree. On account of the colors and the sequence thereof, the information present on the panel in question is contained in the reflected light in the form of a code. A white strip is in principle characterized by the presence of both colors A and B and a black strip by the absence of those colors. The reflected light is decoded by deriving signals from the presence of the colors A and/or B and the duration thereof, and by further processing those signals. As a result, in the receiver a number of pulses are generated, from which, by means of a logic circuit or by a digital computer, the information present on the panel concerned is reproduced whereupon it may be further processed. A vehicle having passed the site of observation thus has been identified.

The invention is aimed at preventing difficulties that may occur in consequence of fouling of panels.

SUMMARY OF THE INVENTION

According to the invention a warning that a specific degree of fouling of a panel is being reached is produced by determining the intensities of the colors A and B in the light received from a white strip and by producing a signal if the difference between the two intensities exceeds a predetermined threshold value.

In the following the color A will be designated as red and the color B as blue. It is preferred that the colors A and B be complementary colors. The optical identification system is of importance especially for railway vehicles.

One effect of fouling of a panel is a reduction of the intensity of the reflected light. In the case of fouling by a colored liquid that reduction is not the same for red and for blue. This results in a fouled white strip being recognized no longer as a white, but as a red or a blue strip, depending on the color of the fouling substance. An oil film, for instance, acts as a red filter, as a result of which a white strip may be recognized as a red one.

As a rule fouling of a panel occurs gradually. This implies that the difference between the intensities of the light reflected from a white strip also increases gradually. Successive observations made each time after a journey has been made by a vehicle will then show an ever increasing difference in intensity. In processing the reflections received, that difference is each time determined and compared with a predetermined threshold value. If the latter is exceeded, then a warning is produced, for instance by typing out, announcing that the panel concerned is heavily fouled.

To preclude confusion, here by difference in intensity is understood the ratio between the intensity of the color that has weakened least and the intensity of the color that has weakened most. For instance, in the case of fouling by oil the ratio red/blue may be 2/1. Thus, when a threshold value for the intensity ratio is exceeded this means that that difference increases.

It is preferred that the said threshold value be smaller than the threshold value at which it is no longer possible to recognize a white strip as such. For, in that case it is ensured that a correct indication is still possible while at the same time a warning is given of the panel concerned being fouled to such an extent that soon it will no longer be possible for a correct indication to be obtained. Even if the panel is not fouled, then, in respect of the possibility of a white strip being recognized as such, the effect of cross talk plays a role. This is a result of the red and blue filters, which distribute the reflected light, not being 100% selective. A strong blue reflection, for instance, may still cause a signal in the red channel. Now, owing to this cross talk there is a risk of a blue or a red strip being identified as a white strip. Because of this, for a correct indication to be obtained in the case of non-fouled panels it is essential that the difference between the intensities of the two observed colors should not be too large.

A suitable threshold value for the production of the alarm signal lies in the range from two to three. At such a value normal identification is still possible and a white strip will still be recognized as such.

An apparatus for the identification of a vehicle incorporating an optical system for scanning a panel carrying a code in the form of colored strips, which panel is fixed to the vehicle, and for receiving light reflected from the panel, as well as a signal processing unit for decoding the reflected light, which signal processing unit is capable of producing from the light intensities of two primary colors A and B, for instance red and blue, analog and digital electric signals corresponding to those intensities, according to the invention comprises:

a. an attenuator connected to the output for analog signals for color A of the aforementioned signal processing unit, b. a subtracting element, of which one input is connected to the output of the attenuator mentioned under (a) and the other input to the output for analog signals for color B of the aforementioned signal processing unit, c. an and-gate, of which the two inputs are connected to the outputs for digital signals for the colors A and B of the aforementioned signal processing unit, d. a switch element with two inputs, connected, respectively, to the output of the subtracting element mentioned under (b) and to the output of the and-gate mentioned under (c), e. a warning device connected to the output of the switch element mentioned under (d).

THE DRAWINGS

The invention will now be further elucidated with reference to some figures in which:

FIG. 1 shows a block diagram of an optical identification system which in itself is known; and

BEST AVAILABLE COP

FIGS. 2 and 3 show block diagrams of the signal processing according to the invention.

DESCRIPTION OF PREFERRED EMBODIMENT

Figure 1:
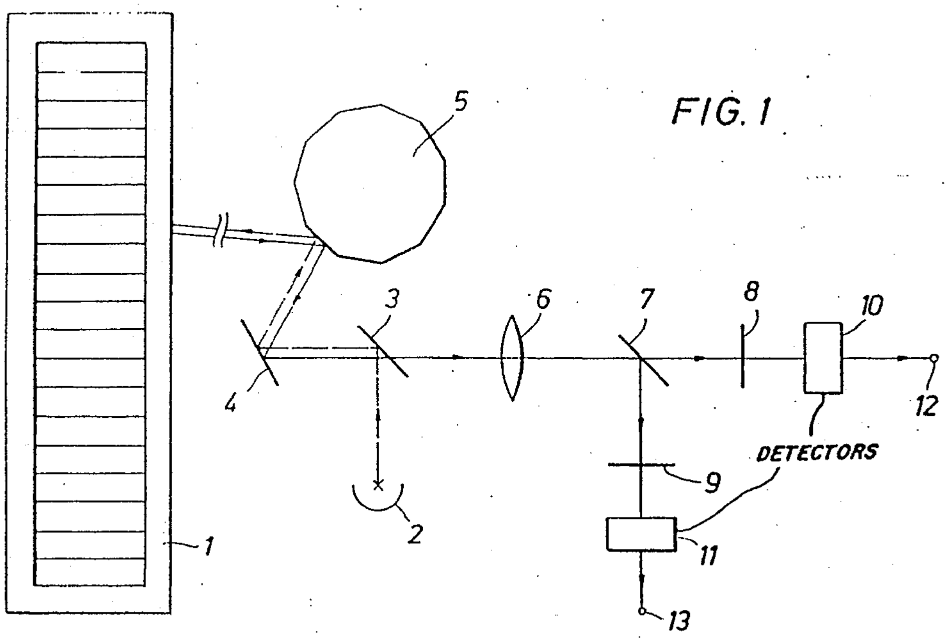

In FIG. 1 item 1 is a panel with colored strips which has been fixed to one side of a railway vehicle. The light from a light source 2 is cast via mirrors 3 and 4 on a rotatable disk 5 provided with a number of plane mirrors. When the disk is being rotated, each time a ray of light sweeps across the panel 1. The colored strips on the panel are made of retro-reflective material. The reflected light travels via the disk 5 and mirror 4 to mirror 3, which is semitransparent. Via lens 6 this reflected light travels to a semitransparent mirror 7. A part of this light passes a red filter 8, another part a blue filter 9. Detector 10 converts a red light signal into an electric signal which can be obtained from terminal 12 as the signal "red." Detector 11 supplies at terminal 13 the electric signal "blue." If the two terminals 12 and 13 receive a signal simultaneously, then the reflected derives from a white strip. If no signal is received, then the strip is black. Red and blue strips supply signals to, respectively, terminal 12 and terminal 13.

Figure 2:
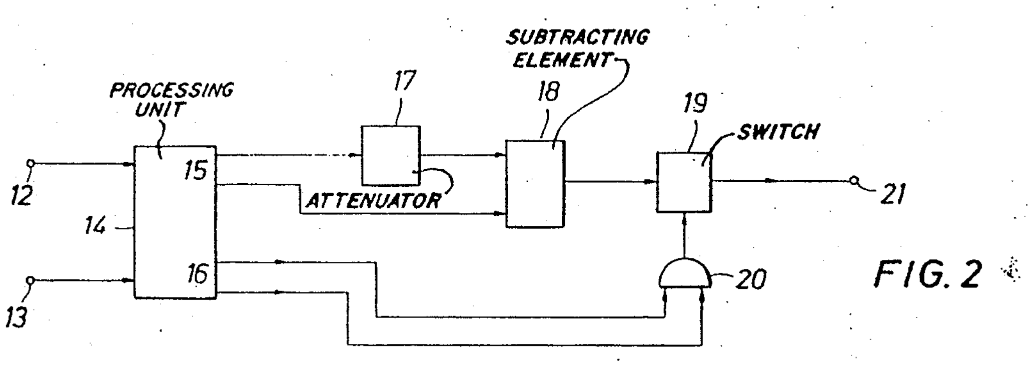

In FIG. 2 the terminals 12 and 13 mentioned hereinbefore are indicated again. The signals which arrive at these terminlas pass to a processing unit 14. In this prcessing unit, which in itself is known, the incoming signals are freed by filtering from noise and from direct current components and are available as analog signals. These are subsequently processed into digital signals, in such a way that in the channel "red" and/or in the channel "blue" a pulse appears each time when in the light received these colors are present in a sufficiently high intensity. The analog signals can be obtained from the outputs 15 and the digital signals from the outputs 16. One of the signals at the outputs 15, for instance the signal "red," is passed to an attenuator 17. The "red" signal, whose amplitude is reduced in that attenuator by a specific factor, travels to a subtracting element 18, just as the "blue" signal coming from the relevant output 15.

At the output of the element 18 a signal will arrive if the difference is zero or becomes negative. This means that in this example the "blue" signal at the subtracting element is equal in magnitude to or weaker than the "red" signal coming from the attenuator 17 if the two signals appear simultaneously. For the attenuation factor for the element 17 a value in the range from two to three is preferred. If, for instance, that factor is chosen to be three, then the element 18 will supply a signal if the intensity of the blue light received is at least three times weaker than the intensity of the red light received simultaneously. The output signal in question travels to a switch element 19. This switch element can perform a switch action upon arrival of the signal in question if certainty has been obtained that the "red" and the "blue" signals derive from reflected light received from a white strip. For this purpose use is made of the pulse-shaped signals from the outputs 16. These are passed to an and-gate 20. If the two outputs 16 receive a pulse simultaneously, then the and-gate 20 allows a signal to pass that is made to travel to the switch element 19. The switch element 19 can perform a switch action only if signals are received simultaneously from the element 18 and from the and-gate 20. If a switch action is performed, then at terminal 21 a signal is received that can be used for producing a warning that the panel in question has reached a specific degree of fouling. This warning may, for instance, be printed together with the full data resulting from the identification of the panel in question by the optical system.

In this example it has been assumed that in the reflected light received from a white strip the blue light has been weakened relatively to the red light. This will be the case when fouling by oil has taken place. If there is a possibility of the red light being weakened relatively to the blue light as a result of fouling, then the attenuator 17 will have to be located in the "blue" channel.

If in the processing unit the incoming signals are delayed, for instance in the case of certain LC circuits being applied, then there is a chance of the digital signals at the outputs 16 being delayed relatively to the analog signals at the outputs 15. This will cause difficulties in the switch element 19 and these difficulties can be obviated by placing between the subtracting element 18 and the element 19 a delaying element with an appropriate delay time so as to ensure that the two signals arriving simultaneously at the element 19 have been delayed to the same extent. Instead of this, it is also possible to place delaying elements in each of the lines from the outputs for analog signals of the signal processing unit, that is between the outputs 15 and the attenuator 17, respectively the subtractor 18.

The invention further provides for the presence in duplicate of the components mentioned hereinbefore under (a) to (e), one attenuator and one subtracting element being connected as indicated under (a) and (b), the other attenuator to the output for analog signals for color B and the other subtracting element to the output for analog signals for color A of the aforementioned signal processing unit. Then a warning is obtained when a specific degree of fouling is being reached by a "red" or by a "blue" substance.

Figure 3:
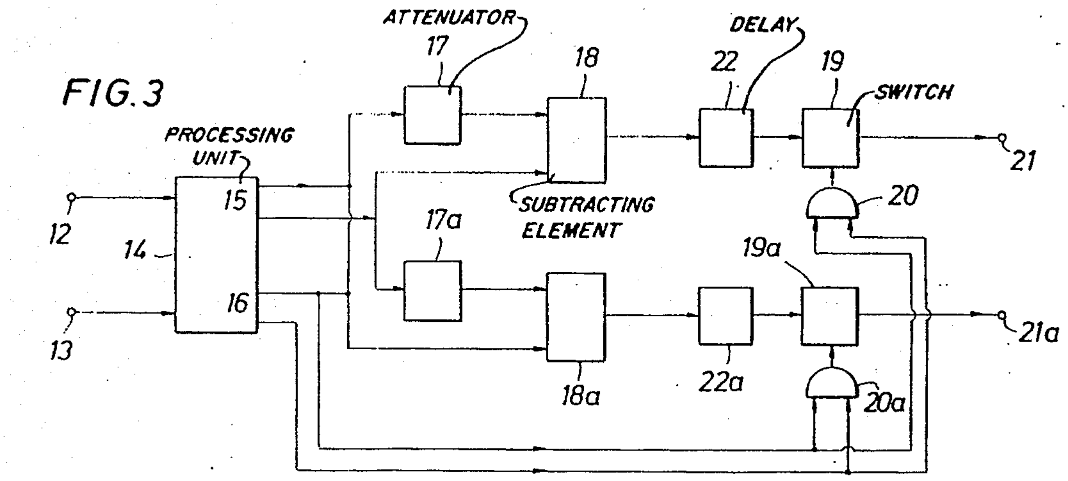

An arrangmeent in duplicate is represented in FIG. 3. Numerals used earlier relate to the same components as before. The numerals 17a, 18a, 19a, 20a, 21a and 22a represent the same components as, respectively, the numerals 17, 18, 19, 20, 21 and 22. The attenuators 17 and 17A are located in different color channels. As a result, a signal will appear at terminal 21 if the ratio of the intensities of the colors A and B, expressed as A/B, exceeds a predetermined threshold value, and at terminal 21a if the ratio expressed as B/A is concerned. The two and-gates 20 and 20a may be replaced by a single and-gate. In the present example delay lines 22 and 22a have been mounted after the subtracting elements 18 and 18a, which has the effect mentioned hereinbefore. Processing of the electric signals obtained from the optical signals may also be done entirely or partly with the aid of a digital computer with appropriate computing program. Then at the same time many other data can be processed or computed, such as quantity of load, prices, excise, material blanaces, etc.

We claim as our invention:

1. An apparatus for the identification of a vehicle, incorporating an optical system for scanning a panel carrying a code in the form of colored strips, which panel is fixed to the vehicle, and for receiving light reflected from the panel, as well as a signal processing unit for decoding the reflected light, which signal processing unit is capable of producing from the light intensities of two primary colors A and B, for instance red and blue,

BEST AVAILABLE COP analog and digital electric signals corresponding to those intensities, which apparatus comprises:

a. an attenuator connected to the output for analog signals for color A of the aforementioned signal processing unit, b. a subtracting element, of which one input is connected to the output of said attenuator and the other input to the output for analog signals for color B of said signal processing unit, c. an and-gate, of which the two inputs are connected to the outputs for digital signals for the colors A and B of said signal processing unit, d. a switch element with two inputs, connected, respectively, to the output of said subtracting element and to the output of said and-gate, e. a warning device connected to the output of the switch element.

2. An apparatus according to claim 1, in which apparatus a delaying element is connected between the subtracting element and the switch element.

3. An aparatus according to claim 1, in which apparatus a delaying element is present in each of the lines from the outputs for analog signals of the signal processing unit.

4. An apparatus according to claim 1 in which apparatus the components mentioned in claim 4 under (a) to (e) are present in duplicate, one attenuator and one subtracting element being connected as indicated under (a) and (b), the other attenuator to the output for analog signals for color B and the other subtracting element to the output for analog signals for color A of the signal processing unit.

* * * * *